(12) United States Patent
Ikawa et al.

(10) Patent No.: US 6,803,685 B2
(45) Date of Patent: Oct. 12, 2004

(54) ENCODER APPARATUS INTEGRATED WITH A SMALL-SIZE MOTOR

(75) Inventors: Masaaki Ikawa, Matsudo (JP); Hisashi Ogino, Matsudo (JP); Wataru Sakurai, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 0 days.

(21) Appl. No.: 10/472,363

(22) PCT Filed: Dec. 17, 2002

(86) PCT No.: PCT/JP02/13169

§ 371 (c)(1),
(2), (4) Date: Sep. 17, 2003

(87) PCT Pub. No.: WO03/055043

PCT Pub. Date: Jul. 3, 2003

(65) Prior Publication Data

US 2004/0113499 A1 Jun. 17, 2004

(30) Foreign Application Priority Data

Dec. 20, 2001 (JP) ......................................... 2001-387499
Dec. 10, 2002 (JP) ......................................... 2002-357548

(51) Int. Cl.$^7$ .......................... H02K 11/00; H02K 23/66
(52) U.S. Cl. ............................... 310/68 B; 310/40 MM; 29/597
(58) Field of Search ....................... 310/68 B, 40 MM, 310/231–233, 236; 29/597

(56) References Cited

U.S. PATENT DOCUMENTS

| 4,788,497 | A | * | 11/1988 | Katsumura | .................. | 324/177 |
| 5,064,031 | A | * | 11/1991 | Kakizaki | .................. | 188/282.2 |
| 5,128,577 | A | * | 7/1992 | Kobayashi | .................. | 310/233 |
| 5,446,328 | A | | 8/1995 | Suzuki et al. | .................. | 310/233 |
| 6,570,350 | B2 | * | 5/2003 | Ohno et al. | .................. | 318/254 |
| 2001/0022505 | A1 | | 9/2001 | Ohno et al. | .................. | 318/560 |

FOREIGN PATENT DOCUMENTS

| JP | 57-15681 | 1/1982 | .......... H02K/23/66 |
| JP | 3-106864 | 11/1991 | .......... H02K/11/00 |
| JP | 6-49090 | 12/1994 | .......... H02K/11/00 |
| JP | 7-284258 | 10/1995 | .......... H02K/23/00 |
| JP | 8-146031 | 6/1996 | .......... G01P/13/04 |
| JP | 9-023617 | 1/1997 | .......... H02K/11/00 |
| JP | 9-191621 | 7/1997 | .......... H02K/23/66 |
| JP | 2000-023424 | 1/2000 | .......... H02K/13/00 |
| JP | 2000-321008 | 11/2000 | ............ G01B/7/00 |
| JP | 2001-238424 | 8/2001 | .......... H02K/23/66 |
| WO | 2003-247857 | * 9/2003 | .......... H02K/11/00 |

\* cited by examiner

*Primary Examiner*—Burton Mullins
(74) *Attorney, Agent, or Firm*—McGlew and Tuttle, P.C.

(57) ABSTRACT

The present invention provides a mechanical encoder device for use in a miniature motor, which encoder can provide, for each revolution of the motor, a plurality of pulses whose duty ratio does not change with time. A rotary contact portion 12 is provided on a rotor shaft 1, and a pair of rotation-detecting brushes 14 in sliding contact with the rotary contact portion 12 are provided on a brush holder 29 of an end cap 6. A plurality of rotary contact pieces 13 are arranged on the outer circumferential surface of the rotary contact portion 12 such that slits are formed therebetween. The paired rotation-detecting brushes 14 are each formed of a resilient metal and each assume the shape of a cantilever plate or wire spring whose side surface portion is subjected to sliding contact. An inter-brush angle α corresponding to an arcuate angle between contact points at which the paired rotation-detecting brushes 14 abut the rotary contact portion 12 is less than an arcuate angle β corresponding to a single rotary contact piece, whereby a plurality of pulses are generated while the rotor shaft rotates one revolution.

12 Claims, 8 Drawing Sheets

Fig. 4
(A)
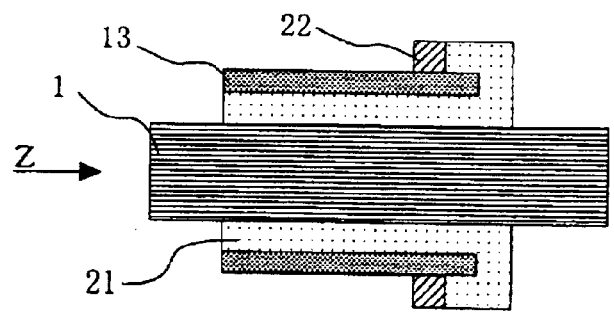
(B)
View in Direction of Arrow Z
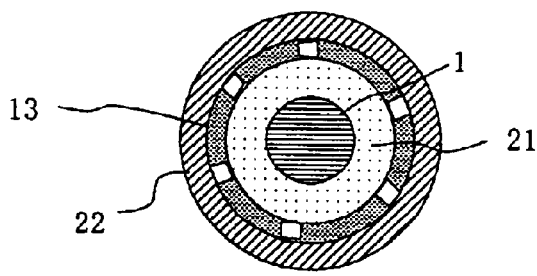
Fig. 5
(A) 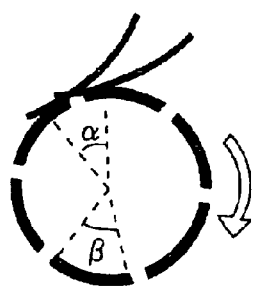
OFF
(B) 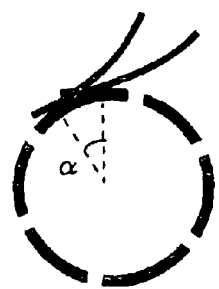
ON : Short Circuit formed between Brushes Fig. 8
Prior Art
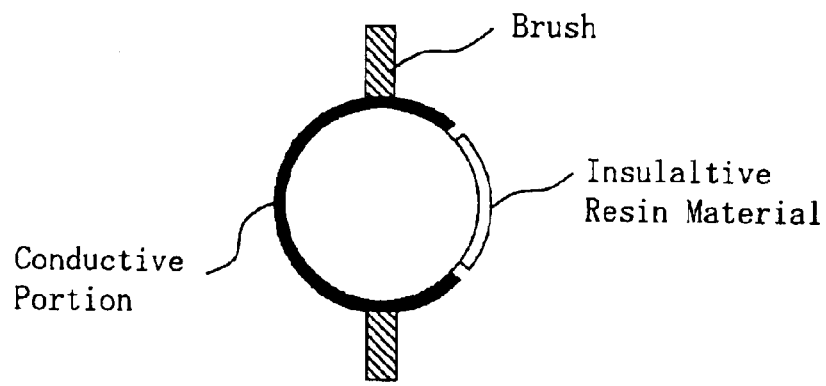
Fig. 9
Prior Art
(A)  (B)
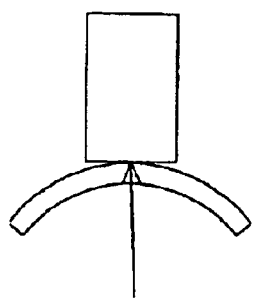 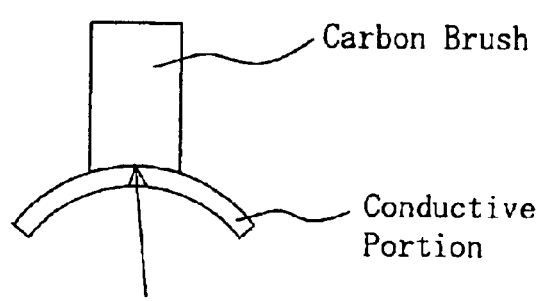
Point Contact  Surface Contact (A)　　　　　　　　　　　　(B)

(A)　　　　　　　　　　　　(B)

Rectangular Recess　　　　　　　　Triangular Recess

Partial Detailed View

ENCODER APPARATUS INTEGRATED WITH A SMALL-SIZE MOTOR

TECHNICAL FIELD

The present invention relates to an encoder device for generating pulses necessary for controlling the rotational speed and position of a motor.

BACKGROUND ART

A miniature motor used, for example, for driving an optical disc such as a CD or DVD is required to incorporate therein a device for detecting the rotational speed and position thereof. Known examples of such a detecting device include a magnetic device which performs magnetic detection by use of a magnet and a Hall device, an optical device which detects reflected light by use of a photodiode and a phototransistor, and a mechanical device which mechanically turns on and off electrical conduction between a pair of brushes. The present invention relates to this mechanical encoder device.

FIG. 7 is a pair of views for explaining a mechanical motor-rotation detection device based on the prior art (refer to Japanese Utility Model Application Laid-Open (kokai) No. S57-15681). As shown in FIG. 7, a rotation-detecting rotary contact portion is provided on a rotor shaft, in sliding contact with a pair of brushes. The rotation-detecting rotary contact portion includes a large-angle conductive portion and a small-angle conductive portion, which are formed of an electrically conductive material such as copper and are provided along the outer circumference thereof. Slits are formed in the boundaries between the large-angle conductive portion and the small-angle conductive portion so as to electrically insulate them from each other.

Thus, when, as shown in FIG. 7(A), one brush is on the small-angle conductive portion, and the other brush is on the large-angle conductive portion, the circuit extending from one brush to the other brush is shut OFF. When, as a result of progress in motor rotation, the state of FIG. 7(B) is reached, the two brushes are on the large-angle conductive portion; thus, the circuit extending from one brush to the other brush is turned ON. In this manner, while the motor rotates one revolution, two ON pulses are generated.

Hence, pulse signals are generated by alternation between an electrically conductive state in which the two brushes are in sliding contact with the large-diameter conductive portion, and an electrically nonconductive state in which one of the brushes is in sliding contact with the small-diameter conductive portion. Rotation can be detected from the thus-generated pulse signals, and the number of revolutions can be detected by counting the pulse signals.

Alternatively, the number of revolutions can be detected according to a similar principle through employment of a rotation-detecting rotary contact portion which, as shown in FIG. 8, includes, in place of the small-angle conductive portion, a nonconductive portion made of an electrically insulative resin material or the like (refer to Japanese Utility Model Publication (kokoku) No. H06-49090 or Japanese Patent Application Laid-Open (kokai) No. H07-284258).

However, in either case, the prior art employs a carbon brush as a rotation-detecting brush. With the progress of wear or the like, a portion of the carbon brush in sliding contact with a conductive portion increases in sliding area. FIG. 9(A) shows an initial state of the carbon brush, in which the carbon brush is in point contact with the conductive portion, since the carbon brush is not worn. By contrast, with increasing time of use of the carbon brush, as shown in FIG. 9(B), the brush undergoes wearing and comes into surface contact with the conductive portion. In this state, the brush cannot be brought in point contact with the conductive portion, and the angle between the two brushes cannot be reduced. Thus, even when, in order to obtain a number of pulses, the number of conductive portions is increased, and the angle between the brushes is reduced, wear on the carbon brushes causes loss of the angle between the brushes, resulting in a failure to function as an encoder device. Since wear on the carbon brush causes an increase in the area of a sliding portion of the brush, the duty ratio of pulses changes.

As described above, since the prior art employs carbon brushes as rotation-detecting brushes, it is impossible to obtain a number of pulses whose duty ratio does not change. A failure to obtain a number of pulses, and involvement of change of duty ratio lead to a failure in applications requiring precision control. The prior art fails to satisfy the need for not only controlling the rotational speed of motor but also accurately controlling the rotational, angular position of motor, on the basis of a detected signal.

The prior art employs a mold structure achieved by use of insert molding in which resin is poured into a mold while a conductive portion or the like is set within the mold. The prior art, employing a mold structure, fails to facilitate a process for manufacturing a motor rotor.

DISCLOSURE OF THE INVENTION

An object of the present invention is to solve the above-mentioned problems, and to provide a mechanical encoder device for use in a miniature motor, which encoder can provide, for each revolution of the motor, a plurality of pulses whose duty ratio does not change with time, and which facilitates generation of a number of pulses, such as six pulses per revolution.

Another object of the present invention is to provide an encoder device allowing easy incorporation into a miniature motor.

An encoder device incorporated in a miniature motor of the present invention is incorporated in a miniature motor having an end cap fitted to a metallic case in such a manner as to close an opening of the metallic case, a rotor configured such that a rotor magnetic-pole and a motor commutator are integrally mounted on a rotatably supported shaft, and two motor brushes abutting the commutator. The encoder device comprises a rotary contact portion provided on the rotor shaft, and a pair of rotation-detecting brushes in sliding contact with the rotary contact portion. A plurality of rotary contact pieces are arranged on an outer circumferential surface of the rotary contact portion such that slits are formed therebetween. The paired rotation-detecting brushes are each formed of a resilient metal and each assume the shape of a cantilever plate or wire spring whose side surface portion is subjected to sliding contact. An inter-brush angle corresponding to an arcuate angle between contact points at which the paired rotation-detecting brushes abut the rotary contact portion is less than an arcuate angle corresponding to a single rotary contact piece, whereby a plurality of pulses are generated while the rotor shaft rotates one revolution.

Linear recesses can be formed by means of grooving or corrugating, or linear through-holes can be formed by means of slitting, along or obliquely with respect to the axial direction of the shaft of the motor on a surface portion of each of the rotary contact pieces which comes in sliding contact with the rotation-detecting brushes.

Furthermore, the rotary contact portion can be mounted on the shaft at an arbitrary position, such as at the same side as the motor commutator or at the side opposite the motor commutator with respect to the rotor magnetic-pole, or at the exterior of the end cap.

BRIEF DESCRIPTION OF DRAWINGS

FIG. 4 is a pair of views showing the configuration of a rotary contact portion, wherein (A) is a sectional view of a shaft cut longitudinally, and (B) is a view of the rotary contact portion shown in (A), as viewed in the direction of arrow Z of (A).

FIGS. 5(A) and (B) are views explaining the operation of the rotary contact portion, taking an example of the case where six rotary contact pieces are arranged.

FIG. 8 is a view for explaining a motor-rotation detection device based on the prior art, different from that of FIG. 7.

FIGS. 9(A) and (B) are views for explaining a phenomenon in which the sliding area of a sliding portion of the prior art carbon brush, which portion is in sliding contact with a conductive portion, increases with the progress of wear or the like.

BEST MODE FOR CARRYING OUT THE INVENTION

Figure 1:
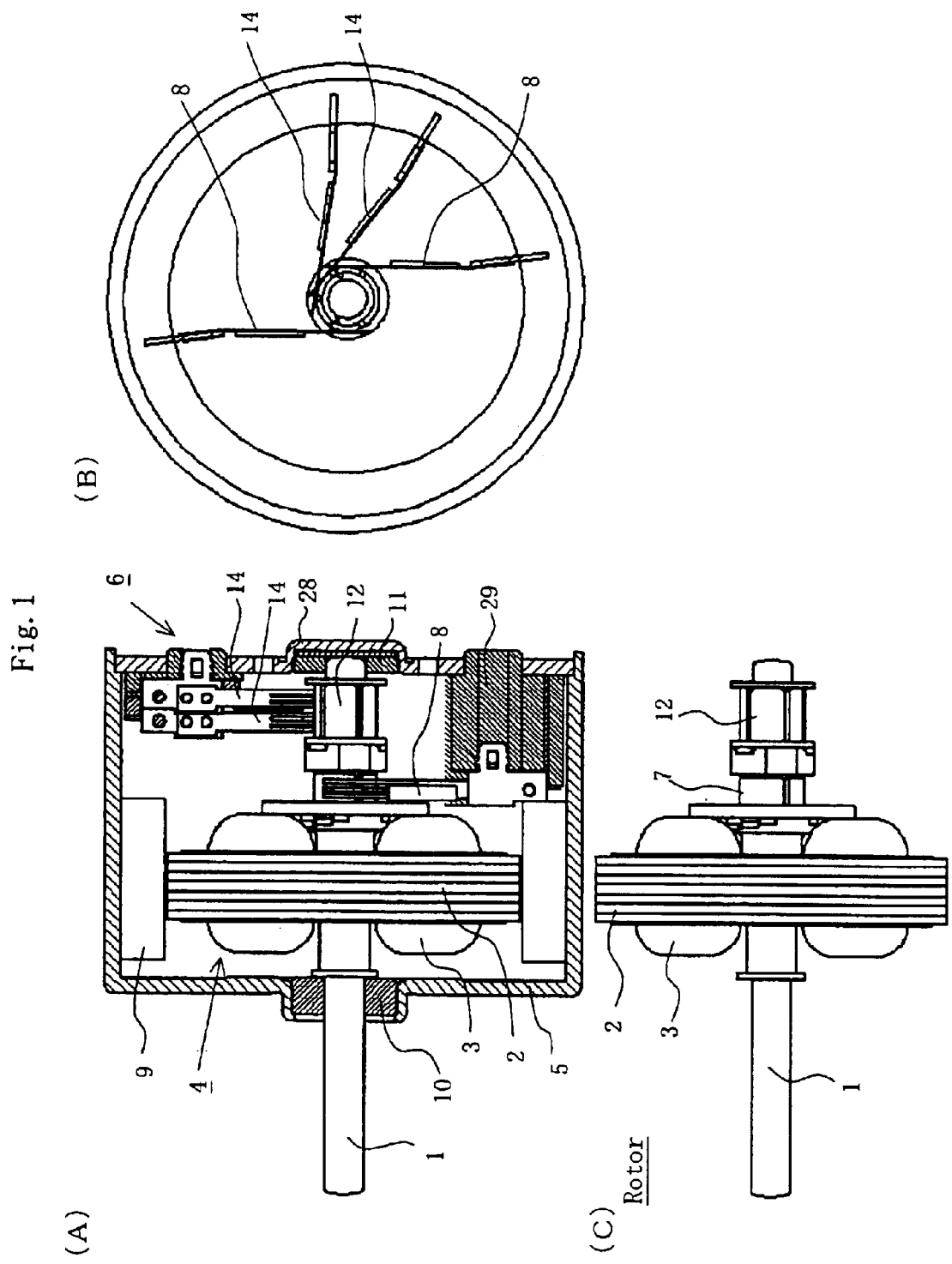
FIG. 1 is a series of views exemplifying a miniature motor to which the present invention is applied, wherein (A) is a longitudinal sectional view of the entire motor, (B) is a view exemplifying the relationship of angular position among motor brushes and rotation-detecting brushes, and (C) is a view showing only a rotor.
Figure 2:
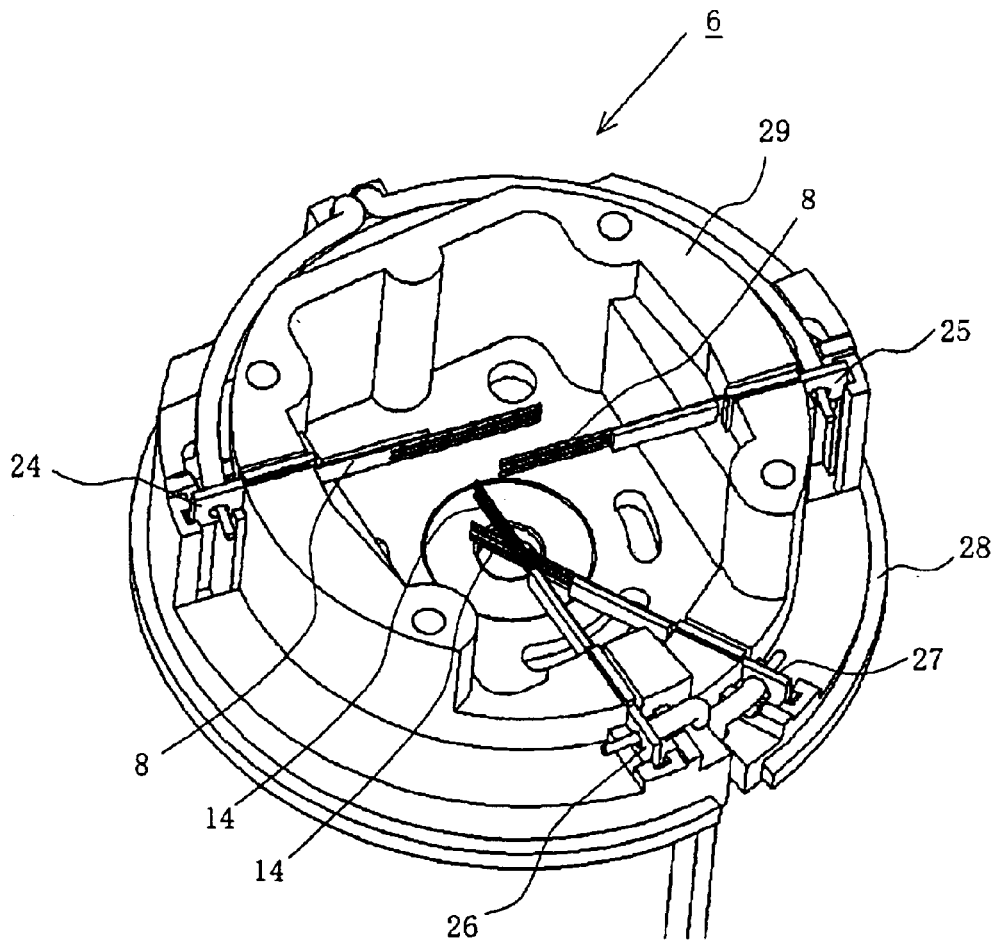
FIG. 2 is a perspective view of an end cap as viewed from the inside of the motor.

The present invention will next be described by way of example. FIG. 1 is a series of views exemplifying a miniature motor to which the present invention is applied, wherein (A) is a longitudinal sectional view of the entire motor, (B) is a view exemplifying the relationship of angular position among motor brushes and rotation-detecting brushes, and (C) is a view showing only a rotor. FIG. 2 is a perspective view of an end cap as viewed from the inside of the motor.

A miniature motor to which the present invention is applicable can be configured by use of ordinary techniques related to an ordinary miniature motor, except for the configuration related to an encoder device including a rotary contact portion and rotation-detecting brushes, which configuration will be described in detail later. A case 5 is formed of a metallic material into a closed-bottomed hollow, cylindrical shape and has a magnet 9 attached thereto. A rotor, as shown particularly in FIG. 1(C), is configured such that a rotor magnetic-pole composed of a laminated core 2 and a winding 3, a motor commutator 7, and a rotary contact portion 12, which will be described in detail later, are integrally mounted on a shaft 1.

After an assembly consisting of the shaft 1 and the rotor 4 is inserted into the metallic case 5 through an opening of the case 5, an end cap 6 is fitted to the metallic case 5 in such a manner as to close the opening. The end cap 6 is composed of a cover plate 28 made of metal, and a brush holder 29 made of a synthetic resin. Usually, a plurality of recesses formed on the cover plate 28 receive corresponding fitting portions of the brush holder 29, whereby the cover plate 28 and the brush holder 29 are united together. A pair of motor brushes 8, which come into contact with the motor commutator 7, are attached to the brush holder 29. The motor brushes 8 are connected, at their end portions longitudinally opposite their end portions in contact with the commutator 7, to corresponding lead wires extending externally from connection portions 24 and 25 of the end cap 6. A pair of rotation-detecting brushes 14 which are characteristic to the present invention and partially constitute an encoder device are attached to the brush holder 29 and are connected to lead wires extending externally from connection portions 26 and 27.

A bearing 11 for the shaft 1 is accommodated in a central portion of the cover plate 28. The other end of the shaft 1 is supported by another bearing 10 provided at the center of a bottom portion of the metallic case 5 and extends outward through the bottom portion so as to be mechanically coupled to an external load. Thus, while the end cap 6 is fitted to the metallic case 5, an extended portion of the shaft 1 protrudes from the metallic-case bottom portion, and the rotor 4 is rotatably supported by the bearings 10 and 11 provided on the metallic-case bottom portion and the end cap 6, respectively. At this time, the motor brushes 8 abut the motor commutator 7, and the rotation-detecting brushes 14 abut the rotary contact portion 12. Notably, the entire end cap 6 can be formed of a synthetic resin. In this case, the motor brushes 8, the rotation-detecting brushes 14, the bearing 11, and the like are attached to the end cap 6 made of a synthetic resin.

Current supplied from an external power supply via the motor brushes 8 and the motor commutator 7 flows through the winding 3 wound on the rotor magnetic-pole, whereby the motor can rotate. Such a configuration and operation of the miniature motor itself are of ordinary practice, except for those of the encoder device, and thus further detailed description thereof is omitted.

The rotary contact portion 12 and the pair of rotation-detecting brushes 14 which are characteristic to the present invention and constitute an encoder device are integrally attached to the exemplified miniature motor. The rotary contact portion 12 is mounted on the shaft 1 adjacently to the motor commutator and on the side opposite the rotor magnetic-pole with respect to the motor commutator. As will be described later with reference to FIGS. 10 and 11, the rotary contact portion 12 can be mounted on the shaft at another position.

FIG. 4 is a pair of views showing the configuration of a rotary contact portion, wherein (A) is a sectional view of a shaft cut longitudinally, and (B) is a view of the rotary contact portion shown in (A), as viewed in the direction of arrow Z of (A). As illustrated, the rotary contact portion is assembled and secured in the following manner: a plurality of (e.g., six) rotary contact pieces 13 are attached to the outer circumferential surface of a rotary contact core 21 made of a nonconductive material such as resin, such that slits are provided therebetween; i.e., in such a manner as to be mutually insulated; subsequently, onto the resultant assembly, a washer 22 made of resin is fitted. The thus-assembled rotary contact portion is mounted on the shaft 1 such that the shaft 1 is press-fitted into a hole formed at the center of the rotary contact core 21. Preferably, the plurality of rotary contact pieces 13 assume the same shape and configuration, or at least the same arcuate length (circumferential length). Otherwise, a plurality of pulses generated while the motor rotates one revolution fail to exhibit the same duty ratio.

As shown in FIG. 2, the pair of rotation-detecting brushes 14 in contact with the rotary contact piece 13 are attached to the end cap 6. The paired rotation-detecting brushes 14 are arranged in such a manner as to be spaced by a certain angle about the shaft axis, and at such a sufficient interval in the direction of the shaft axis as not to come into contact with each other.

The rotation-detecting brushes 14 are metallic brushes and, as shown in FIG. 2, assume the shape of a cantilever plate or wire spring; and their end portion may be slit in the manner of a fork. A material for the brushes 14 is a resilient metal such as a spring tempered phosphor bronze. Also, a portion of the metallic brush which comes into contact with the rotary contact piece can be clad with a noble metal which contains a predominant amount of silver.

Figure 6:
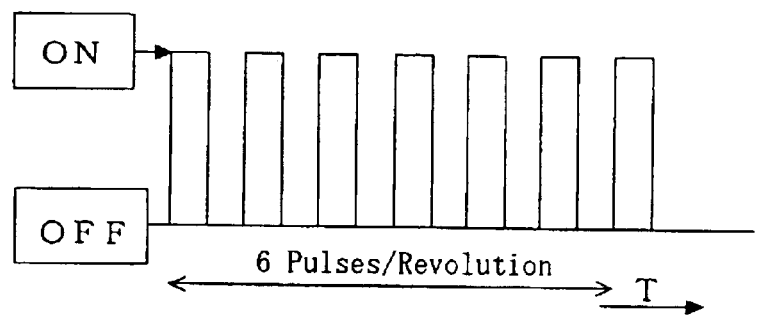
FIG. 6 is a view showing pulses generated from the rotary contact portion exemplified in FIG. 5.
Figure 7:
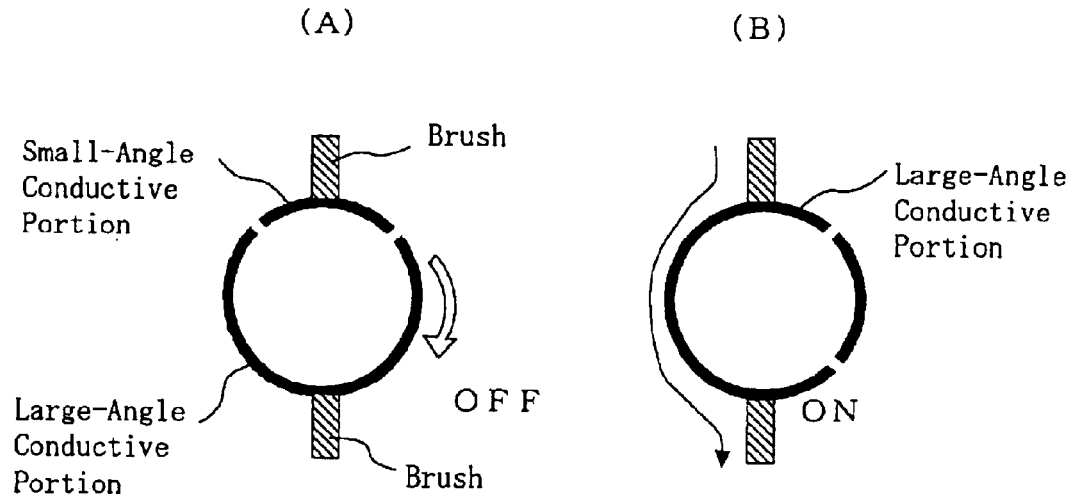
FIGS. 7(A) and (B) are views for explaining a motor-rotation detection device based on the prior art.

The operation of the rotary contact portion will be described with reference to FIGS. 5 and 6, while taking a rotary contact portion with six rotary contact pieces 13 as an example. FIG. 5(A) shows a state in which paired rotation-detecting brushes are in contact with different, adjacently disposed rotary contact pieces. In this case, the circuit extending from one of the paired rotation-detecting brushes to the other is turned OFF.

When motor rotation progresses from this state in the direction of the arrow, the state shown in FIG. 5(B) is reached. At this time, since the paired rotation-detecting brushes are on the same rotary contact piece, the circuit extending from one of the paired rotation-detecting brushes to the other brush is shorted. This state is denoted as an ON state. As a result, as shown in FIG. 6, six pulses are generated while the motor rotates one revolution. In FIG. 6, T represents a time axis. As is apparent from the above description, when angle α between the paired rotation-detecting brushes is equal to or greater than arcuate angle β corresponding to a single rotary contact piece (see FIG. 5(A); β<360°/number of rotary contact pieces), the two brushes are never short-circuited on a single rotary contact piece. Therefore, in order to generate an ON pulse, angle α must be not greater than angle β. According to the present invention, through adjustment of inter-brush angle α, rotary-contact-piece arcuate angle β, and an arcuate angle corresponding to a single slit, a wide range of duty ratios can be obtained including a duty ratio of 50%.

Figure 3:
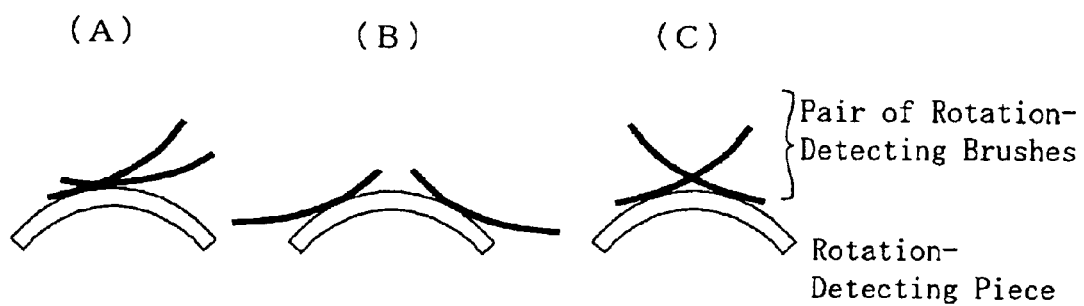
FIGS. 3(A), (B), and (C) are views for explaining attachment of the rotation-detecting brushes.

As shown in FIG. 5, inter-brush angle α is an arcuate angle formed by two contact points at which the two brushes come into contact with a rotary contact piece. In the brush arrangement exemplified in FIG. 2, this angle is equal to an angle of mounting brushes about the shaft axis. However, brush arrangement is not limited thereto. FIG. 3 is a series of views for explaining mounting of brushes. (A) shows a method in which, as in the case of FIG. 2, the brushes are attached in such a manner as to extend from the substantially same direction. This method enables arrangement of the brushes at a small inter-brush angle α. (B) or (C) shows that, even when the brushes are arranged in such a manner as to extend from mutually opposite directions, the inter-brush angle can be set to a small value. As described above, in order to generate a number of pulses through provision of a number of rotary contact pieces, inter-brush angle α must be reduced. In order to meet this requirement, in the exemplified miniature motor, the two rotation-detecting brushes are positionally shifted from each other in the direction of the rotor shaft so as to avoid mutual contact while inter-brush angle α is set to a small value.

Conventionally, as described in aforementioned Japanese Patent Application Laid-Open (kokai) No. H07-284258, detection of not only the number of revolutions but also rotational direction is enabled through obtainment of two rotation detection signals of mutually shifted phases. In the present invention, the rotation-detecting brushes assume the shape of a cantilever plate or wire spring, whereby sufficient space for attachment of another pair of rotation-detecting brushes can be easily secured. For example, in the case of a six pulses/revolution encoder, two pairs of rotation-detecting brushes can be arranged on the same rotary contact portion in such a manner as to be mutually shifted by 165° or 195°. In this manner, a two-phase encoder can be easily configured without an increase in the overall size of the motor.

Figure 10:
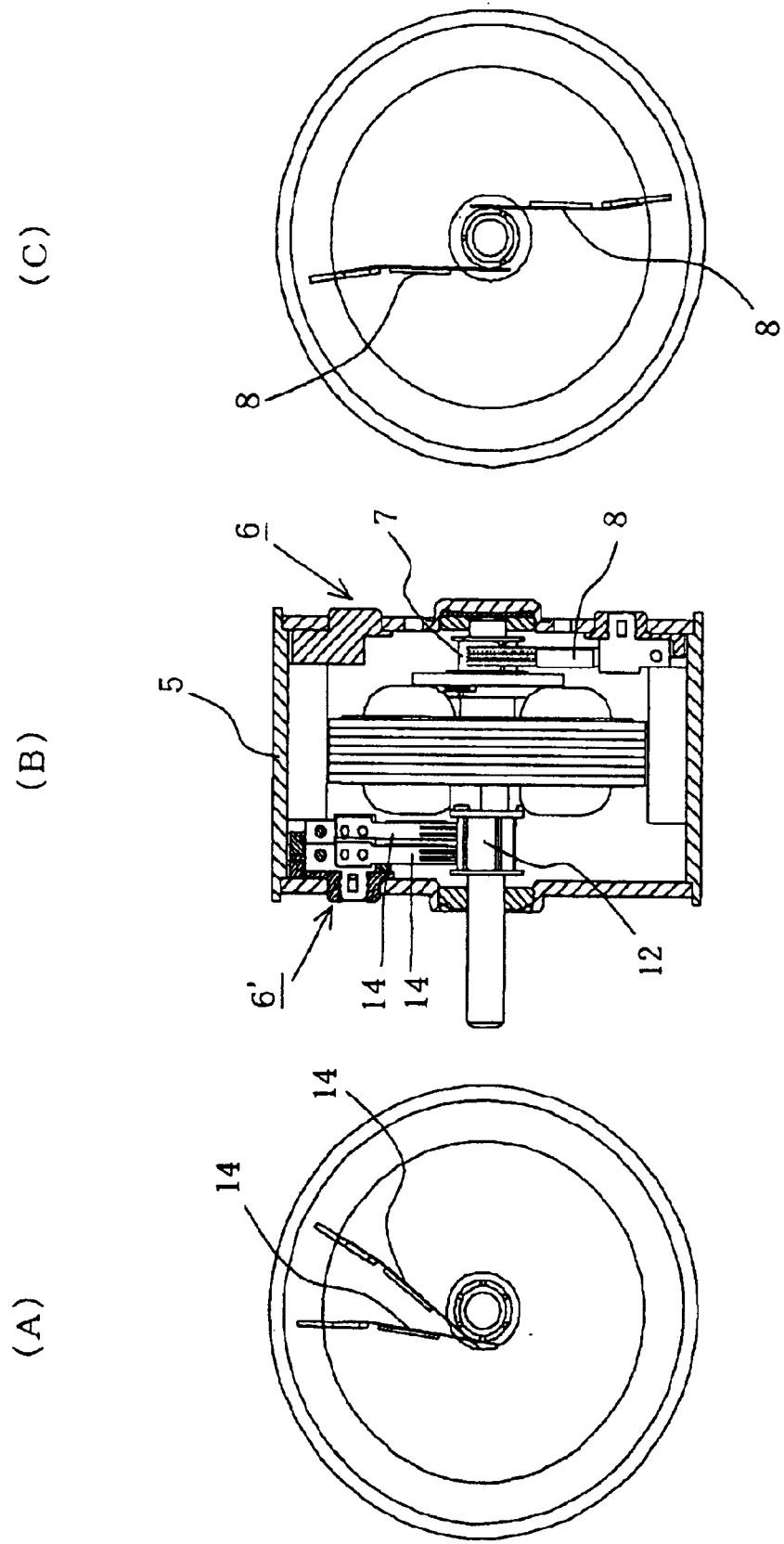
FIG. 10 is a series of views showing another example of a miniature motor to which the present invention is applied, wherein (A) is a view exemplifying the relationship of angular position between rotation-detecting brushes; (B) is a longitudinal sectional view of the entire motor; and (C) is a view exemplifying the relationship of angular position between motor brushes.

FIG. 10 is a series of views showing another example of a miniature motor to which the present invention is applied and which differs from that of FIG. 1 in the mounting position of an encoder device including a rotary contact portion and rotation-detecting brushes. (A) is a view exemplifying the relationship of angular position between rotation-detecting brushes; (B) is a longitudinal sectional view of the entire motor; and (C) is a view exemplifying the relationship of angular position between motor brushes.

An exemplified metallic case 5 is formed into a hollow, cylindrical shape, but differs from the counterpart of FIG. 1 in that opposite ends thereof are open, and end caps 6 and 6' are attached to the corresponding opposite openings. A magnet serving as a stator magnetic-pole is attached to the metallic case 5, and a rotor magnetic-pole composed of a laminated core and a winding is mounted on a shaft in a manner similar to that of FIG. 1. However, in FIG. 10, a motor commutator 7 is mounted at one side of the rotor magnetic-pole, and a rotary contact portion 12 is mounted at the other side of the rotor magnetic-pole.

One end cap 6 is fitted to one opening of the metallic case 5, and the rotor integrally assembled on the shaft is inserted into the metallic case 5. Subsequently, the other end cap 6' is fitted to the other opening of the metallic case 5 in such a manner as to close the opening. Two motor brushes 8 corresponding to the motor commutator 7 are attached to the end cap 6, whereas two rotation-detecting brushes 14 corresponding to the rotary contact portion 12 are attached to the end cap 6'.

Figure 11:
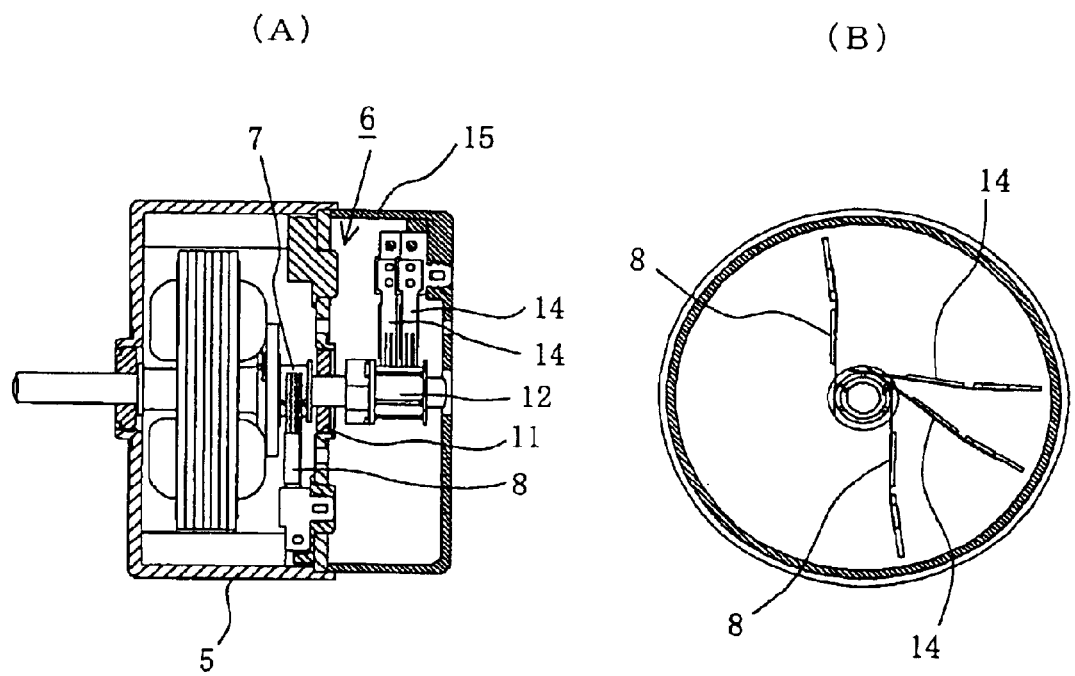
FIG. 11 is a pair of views exemplifying still another example of a miniature motor to which the present invention is applied, wherein (A) is a longitudinal sectional view of the entire motor, and (B) is a view exemplifying the relationship of angular position among motor brushes and rotation-detecting brushes.

FIG. 11 is a pair of views exemplifying still another example of a miniature motor to which the present invention is applied and in which an encoder device including a rotary contact portion and rotation-detecting brushes is mounted on a portion of a shaft located at the exterior of an end cap. (A) is a longitudinal sectional view of the entire motor, and (B) is a view exemplifying the relationship of angular position among motor brushes and rotation-detecting brushes.

The illustrated miniature motor differs in configuration from that of FIG. 1 in that only the pair of motor brushes 8, which comes into contact with a motor commutator 7, is attached to the inside of an end cap 6, which is to be fitted to an opening of a metallic case 5 assuming a closed-bottomed hollow, cylindrical shape. The motor shaft protrudes to the exterior of a bearing 11 provided on the end cap 6. A rotary contact portion 12 is mounted on the shaft at the protruding portion.

Furthermore, an encoder case 15 made of a synthetic resin is attached to an end of the metallic case 5 to which the end cap 6 is fitted. The case 15 can be attached to the metallic case 15 or to the end cap 6 by appropriate attaching means, such as fitting, bonding, or welding. Two rotation-detecting brushes 14 connected to externally extending lead wires (not shown) are attached to the encoder case 15. Employment of this configuration facilitates manufacture, since, after a miniature motor section is assembled according to an ordinary practice, the encoder device can be attached thereto at the final stage of assembly.

The above description refers to the illustrated example in which the encoder device is attached in such a manner as to be located at the exterior of the end cap 6. However, even when the encoder device is attached in such a manner as to be located at the exterior of a bottom portion of the case 5, a similar function can be attained. In this case, the rotary contact portion is mounted on a portion of the shaft which protrudes from the motor to the exterior of the bottom portion of the case 5; the rotation-detecting brushes are attached to the encoder case at a position corresponding to the rotary contact portion; and the thus-prepared encoder case is attached to the metallic case.

FIGS. 12(A) and (B) are views showing another example of a rotary contact piece. As illustrated, linear recesses are formed, by means of grooving or corrugating, along or obliquely with respect to the shaft axis of the motor on a surface portion of the rotary contact piece which comes in sliding contact with a metallic brush. The linear recesses can assume an arbitrary shape. (A) exemplifies grooving for forming a rectangular cross section, and (B) exemplifies corrugating for forming a triangular cross section. Preferably, this cross-sectional shape is a smooth triangular shape having no apex.

When a metallic brush (particularly, a metallic brush clad with noble metal) is used, in some cases, the rotation-detecting brush may wear during motor operation while shaving a rotary contact piece, though the degree of shaving is slight. In such a case, a thin hairlike shaving is generated from the rotary contact piece located at either side of the sliding rotation-detecting brush. On rare occasions, the shaving is straight and is caught at such a position as to short-circuit adjacent rotary contact pieces. On such occasion, the rotary contact pieces, which are usually electrically insulated from each other, are short-circuited, resulting in a failure to generate a normal output waveform.

This linear shaving can be reduced in length through provision of recesses as exemplified in FIGS. 12(A) and (B). Even though a shaving is generated, if the shaving is shorter than a gap between rotary contact pieces, the adjacent rotary contact pieces are not short-circuited.

Figure 12:
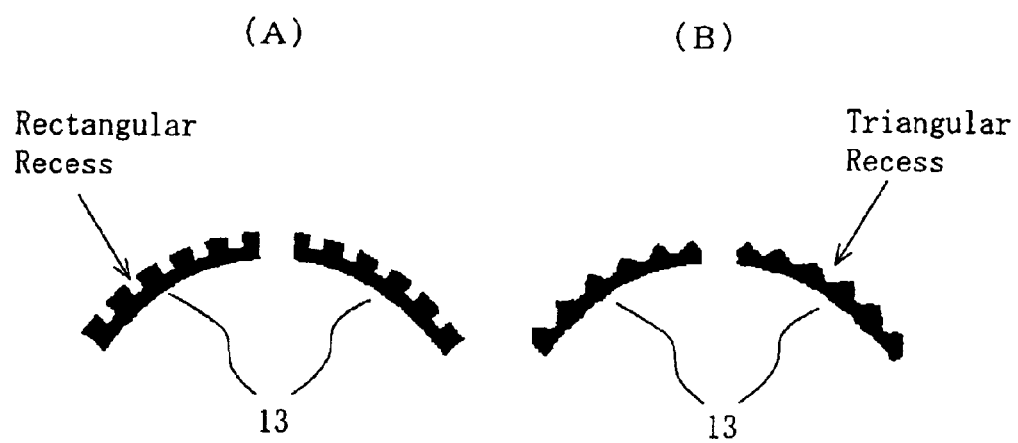
FIGS. 12(A) and (B) are views showing another example of a rotary contact piece.
Figure 13:
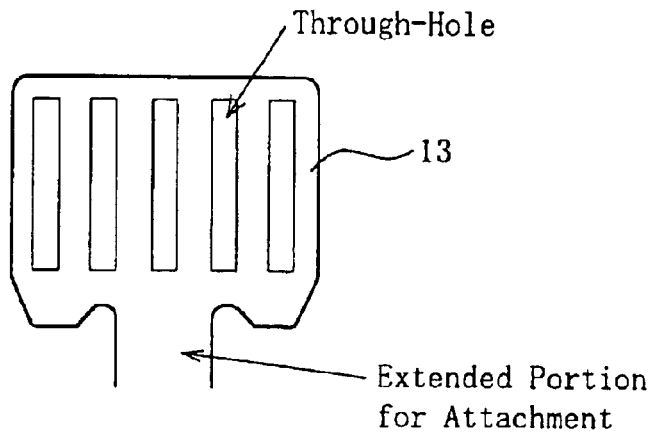
FIG. 13 is a plan view of still another example of a rotary contact piece as viewed before the contact piece undergoes bending.
Figure 14:
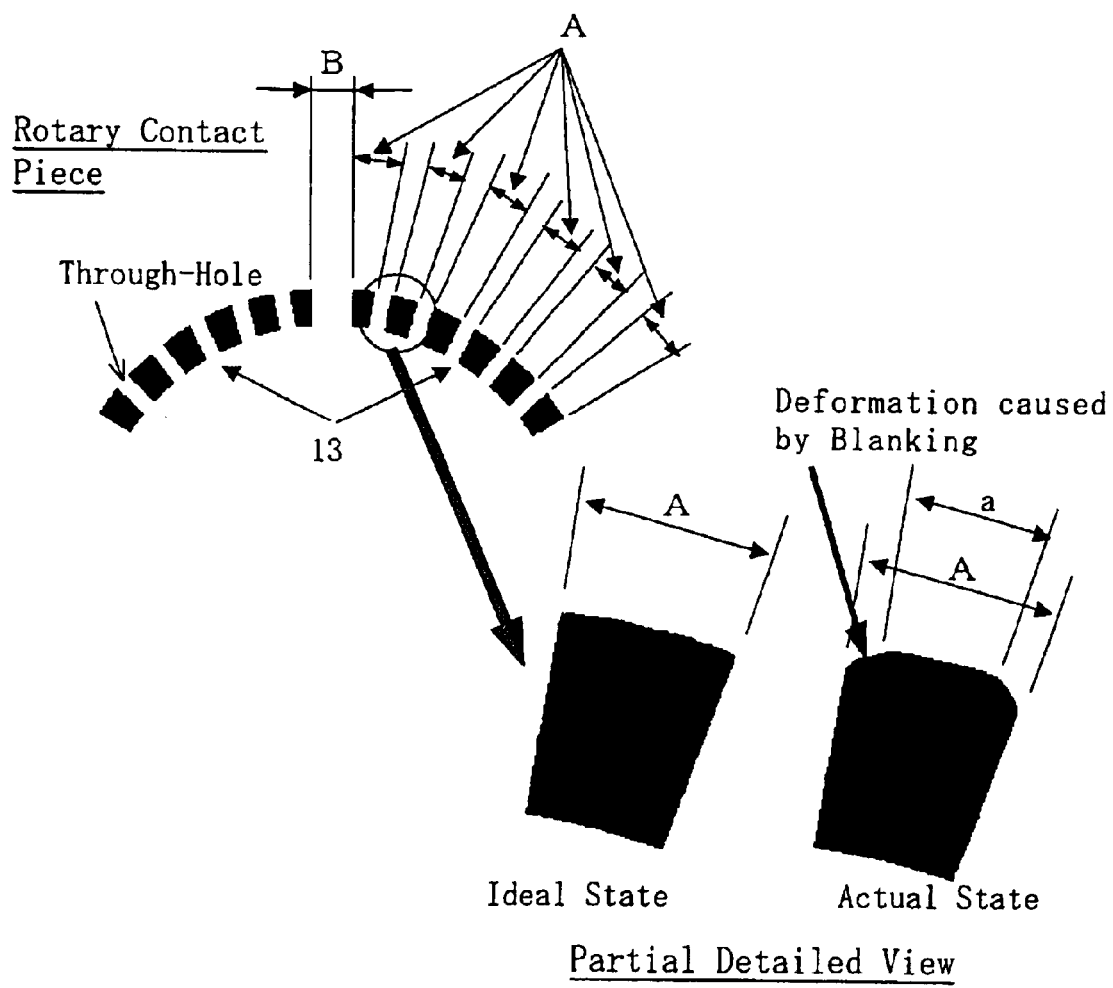
FIG. 14 is a sectional view of rotary contact pieces which are exemplified in FIG. 13 and incorporated in a rotary contact portion after having undergone bending.

FIGS. 13 and 14 are views showing still another example of a rotary contact piece. FIG. 13 is a plan view of an as-blanked contact piece as viewed before the contact piece undergoes bending. FIG. 14 is a sectional view of rotary contact pieces which are incorporated in a rotary contact portion after having undergone bending from the state shown in FIG. 13. The section is taken along the sliding direction of a rotation-detecting brush. The rotary contact piece of FIGS. 13 and 14 differs from that of FIG. 12 in that through-holes (slits) are formed in place of recesses exemplified in FIG. 12. When a rotary contact piece in the shape exemplified in FIG. 13 is blanked out, linear through-holes can simultaneously be punched in the direction of the shaft axis. Thus, manufacture is facilitated as compared with the case of the configuration exemplified in FIG. 12.

As is apparent from the description which has been made with reference to FIG. 12, in FIG. 14, the relationship between circumferential length A of each of portions into which a rotary contact piece is divided by through-holes (slits), and length B of a gap between rotary contact pieces must be A<B. However, as shown in a partial detailed view of FIG. 14, in actual blanking, through-holes are not cut out in an acutely-angled condition as shown in the ideal state view, but deformation arises such that cut edges are rounded. In FIG. 14, "a" represents the length of a linear portion obtained after exclusion of deformed portions from circumferential length A of a rotary contact piece; i.e., the length of a rotation-detecting brush sliding portion. This length a could change with wear of a rotational contact piece. However, in ordinary use, wear of a rotary contact piece is shallower than the depth of deformed portions.

Therefore, strictly speaking, the "circumferential length of a rotary contact piece" which must be less than length B of a gap between rotary contact pieces is not circumferential length A in the ideal state, but is length a of a portion actually formed through blanking and excluding deformed portions.

The exemplified through-holes are arranged such that the linearly extending direction thereof is in parallel with the motor shaft direction. However, the present invention is not limited thereto. The through-holes may be arranged obliquely with respect to the shaft direction.

Preferred configuration being such that a substantial circumferential length of a rotary contact piece is less than the length of a gap between rotary contact pieces is also applied to the case of linear recesses described previously with reference to FIG. 12.

INDUSTRIAL APPLICABILITY

The present invention employs metallic brushes assuming the shape of a cantilever plate or wire spring. Even when such a metallic brush is worn, sliding area remains very small as compared with the case of a carbon brush. Thus, point contact with a rotary contact piece is still maintained, whereby an angle between rotation-detecting brushes can be reduced, and pulses of a small change in duty ratio can be obtained. Also, a number of pulses can be easily obtained through increase in the number of rotary contact pieces. Through employment of rotary contact pieces of the same shape, a number of pulses of uniform duty ratio can be obtained.

As mentioned above, the present invention makes it easy to obtain, for each revolution of the motor, a plurality of pulses which maintain a constant duty ratio within each revolution and whose duty ratio does not change with time, and makes it possible to freely set the number of pulses per revolution and duty ratio as desired, through appropriate setting of the number of rotary contact pieces and the angle between rotation-detecting brushes. Thus, the motor can be used in applications which require precision control.

Since the present invention allows a rotary contact portion to assume an assembly-type structure, cost can be reduced as compared with the case of the prior art mold structure.

According to the present invention, rotary contact pieces are subjected to surface grooving or corrugation, or linear through-holes are formed in the rotary contact pieces. Thus, even when a shaving of a rotary contact piece is generated during motor operation, the shaving does not cause short circuit between adjacent rotary contact pieces, whereby normal output can be obtained.

What is claimed is:

1. An encoder device incorporated in a miniature motor, the encoder device being incorporated in a miniature motor having an end cap fitted to a metallic case in such a manner as to close an opening of the metallic case, a rotor configured such that a rotor magnetic-pole and a motor commutator are integrally mounted on a rotatably supported shaft, and two motor brushes abutting the commutator;

the encoder device comprising a rotary contact portion provided on the rotor shaft, and a pair of rotation-detecting brushes in sliding contact with the rotary contact portion;

wherein a plurality of rotary contact pieces are arranged on an outer circumferential surface of the rotary contact portion such that slits are formed therebetween;

the paired rotation-detecting brushes are each formed of a resilient metal and each assume the shape of a cantilever plate or wire spring whose side surface portion is subjected to sliding contact; and an inter-brush angle corresponding to an arcuate angle between contact points at which the paired rotation-detecting brushes abut the rotary contact portion is less than an arcuate angle corresponding to a single rotary contact piece, whereby a plurality of pulses are generated while the rotor shaft rotates one revolution.

2. An encoder device incorporated in a miniature motor as described in claim 1, wherein linear recesses are formed, by means of grooving or corrugating, along or obliquely with respect to the axial direction of the shaft of the motor on a surface portion of each of the rotary contact pieces which comes in sliding contact with the rotation-detecting brushes.

3. An encoder device incorporated in a miniature motor as described in claim 2, wherein a substantial circumferential length of each of portions of each rotary contact piece formed through division by the recesses is less than a length of a gap between the rotary contact pieces.

4. An encoder device incorporated in a miniature motor as described in claim 1, wherein linear through-holes are formed, by means of slitting, along or obliquely with respect to the axial direction of the shaft of the motor on a surface portion of each of the rotary contact pieces which comes in sliding contact with the rotation-detecting brushes.

5. An encoder device incorporated in a miniature motor as described in claim 4, wherein a substantial circumferential length of each of portions of each rotary contact piece formed through division by the through-holes is less than a length of a gap between the rotary contact pieces.

6. An encoder device incorporated in a miniature motor as described in claim 1, wherein the rotary contact portion is mounted on the shaft adjacently to the motor commutator and on the side opposite the rotor magnetic-pole with respect to the motor commutator.

7. An encoder device incorporated in a miniature motor as described in claim 1, wherein the rotary contact portion is mounted on the shaft such that the motor commutator is located at one side of the rotor magnetic-pole, whereas the rotary contact portion is located at the other side of the rotor magnetic-pole; and the rotation-detecting brushes are located at a position corresponding to the rotary contact portion.

8. An encoder device incorporated in a miniature motor as described in claim 1, wherein the rotary contact portion is mounted on a portion of the shaft which protrudes from the motor to the exterior of the end cap or to the exterior of a bottom portion of the metallic case; the rotation-detecting brushes are attached to an encoder case at a position corresponding to the rotary contact portion; and the encoder case is attached to the metallic case or to the end cap.

9. An encoder device incorporated in a miniature motor as described in claim 1, wherein the rotary contact portion is assembled and secured such that the plurality of rotary contact pieces are attached to an outer circumferential surface of a rotary contact core which is to be mounted on the rotor shaft and is made of a nonconductive material such as resin; subsequently, onto a resultant assembly, a washer is fitted.

10. An encoder device incorporated in a miniature motor as described in claim 1, wherein the paired rotation-detecting brushes are attached to a brush holder which is provided on the end cap and made of resin and to which the motor brushes are attached.

11. An encoder device incorporated in a miniature motor as described in claim 1, wherein the paired rotation-detecting brushes are arranged in such a manner as to be spaced at such a sufficient interval in the axial direction of the shaft as not to come into contact with each other.

12. An encoder device incorporated in a miniature motor as described in claim 1, wherein a portion of each of the paired rotation-detecting brushes which portion comes into contact with the rotary contact portion is clad with a noble metal.

* * * * *